UNITED STATES PATENT OFFICE.

WILLIAM H. WILLIAMS, OF CINCINNATI, OHIO, ASSIGNOR OF ONE-HALF TO PAUL MOHR, OF SAME PLACE.

PROCESS OF PRODUCING AN ELECTROPLATING BATH AND SALTS.

SPECIFICATION forming part of Letters Patent No. 286,359, dated October 9, 1883.

Application filed March 8, 1883. (Specimens.)

*To all whom it may concern:*

Be it known that I, WILLIAM H. WILLIAMS, a citizen of the United States, residing at Cincinnati, in the county of Hamilton and State of Ohio, have invented certain new and useful Improvements in Processes of Producing an Electroplating Bath and Salts; and I do hereby declare the following to be a full, clear, and exact description of the invention, such as will enable others skilled in the art to which it appertains to make and use the same.

This invention has for its objects the production of salts or baths for electro-deposits upon metals, as more fully hereinafter specified.
In carrying out my invention I take two pounds troy of dry clay or of oxide of aluminum, and two pounds of sugar and two gallons of water, and mix and stir the same, after which I let the mixture stand until the insoluble portions have precipitated or settled. I then decant the clear portion into a suitable vessel, and add to the clear portion retained two ounces of muriate of iron, sulphate of iron, or any other soluble salt of iron, and when the solution is effected, dissolve in the same thirty-two ounces troy of tartaric acid. After this I add a strong solution of caustic potash by degrees, stirring constantly, until the tartaric acid appears to be exhausted. I then let the mixture stand until the precipitate formed has settled, after which I filter the solution from it. The solid portion left is to be treated, as hereinafter specified, to form the salt. Instead of the salt above mentioned, however, in some instances I prefer to employ a salt prepared as follows, viz: to take two pounds troy of dry clay or oxide of aluminum and two pounds stearic acid and mix the same together at a moderate heat, adding water in small quantities at a time to the mixture, and constantly stirring the same during the operation until neither excess of water or oil is perceptible, when the mass is emptied into two and a quarter gallons of water and well stirred, and then the whole left to settle. When settled, the liquor is decanted carefully from the sediment and treated with the iron, tartaric acid, and potash solutions in the proportions and manner before mentioned, and the resulting precipitates treated as hereinafter described. I now take the salt obtained from either of the above processes, or a tartrate of aluminum, and treat the same as follows: to form the salt desired by dissolving thirty-two ounces troy of either one of said first-mentioned salts in one gallon of water with twenty-eight ounces troy of cyanide of potassium, and neutralize the same with thirty-two ounces of tartaric acid. This operation should be performed in the open air, or under such circumstances as to avoid the danger from the liberated cyanogen, which might result in the case of impurity of the materials used. A precipitate is produced by this last operation, and when the same has settled the liquid is filtered from it and condensed by evaporation to the point of crystallization, which may be determined by withdrawing a portion and cooling it. I then withdraw the solution from the fire, allow it to cool and crystallize, separate the mother-liquor, and dry the salt upon a sieve. This constitutes the salt from which the plating-bath may be prepared. To prepare the bath I dissolve the salt in water, using nine ounces of the salt to one gallon of water for depositing on copper, and sixteen ounces of the salt to one gallon of water for plating iron, with one ounce of cyanide of potassium for each four ounces of the plating-salt. The article to be coated with aluminum is then immersed in this bath and connected with the negative pole of a battery or other source of electricity, using as an anode a metal insoluble in such solution—such as platinum—or a piece of carbon may be employed. I maintain the strength of the bath by partially immersing in it a porous cup or vessel containing undissolved salt—that is to say, the salts resulting from the before-mentioned solutions set forth in the present application—or oxide of aluminum. I may, if desired, place the anode in the porous vessel, and may use an anode of aluminum, in which case the crystals will not be necessary.

If desired, the cyanide solution may be used directly as a bath without evaporation and crystallization, as above mentioned.

I do not desire to limit myself to the use of sugar or stearic acid as an agent in producing the solutions used in preparing the described salts, as any one of the alcohols or the acid derivatives thereof may be employed in lieu thereof; but these I deem the best; neither do I desire to limit myself to the cyanide of potassium, as other compounds of cyanogen with a base or radical may be employed in lieu thereof.

The process of electroplating by means of the bath and salts herein described will form the subject-matter of a separate application.

I claim—

1. As a new article of manufacture, the soluble crystalline plating-salts or compound herein described, prepared from clay, sugar, iron, tartaric acid, caustic potash, and cyanide of potassium, or their described equivalents, as hereinbefore described.

2. The process of producing a soluble crystalline plating compound or salt, consisting in treating clay or other material containing aluminum with a liquid, sugar, iron, tartaric acid, caustic potash, and cyanide of potassium, or their equivalents, as herein described.

3. The process of producing a plating solution, consisting in mixing clay or other material, containing aluminum with a liquid, sugar, iron, tartaric acid, caustic potash, and cynanide of potassium or their equivalents, as herein described.

4. The bath for electroplating herein described, prepared from clay or other material containing aluminum with sugar, iron, tartaric acid, caustic potash, and cyanide of potassium, or their equivalents, substantially as set forth.

In testimony whereof I affix my signature in presence of two witnesses.

WM. H. WILLIAMS.

Witnesses:
WARREN C. STONE,
W. C. MURDOCK.

Correction in Letters Patent No. 286,359.

It is hereby certified that Letters Patent No. 286,359, granted October 9, 1883, upon the application of William H. Williams, of Cincinnati, Ohio, for an improvement in the "Process of Producing an Electroplating Bath and Salts," were erroneously issued to the said William H. Williams and Paul Mohr, as assignee of "one-half" interest therein, instead of *one-third* interest; that the proper correction has been made in the files pertaining to the case in the Patent Office; and that the grant should be read with this correction therein to make it conform to the record of the case in the Patent Office.

Signed, countersigned, and sealed this 30th day of October, A. D. 1883.

[SEAL.]

M. L. JOSLYN,
*Acting Secretary of the Interior.*

Countersigned:
E. M. MARBLE,
*Commissioner of Patents.*